FIG. 4

INVENTORS
CHARLES E. BROOKS
H. J. O'NEILL
W. M. STOVER

ATTORNEY

FIG. 6

INVENTORS CHARLES E. BROOKS
H. J. O'NEILL
W. M. STOVER

ATTORNEY

April 16, 1963

C. E. BROOKS ETAL 3,086,084

CIRCUIT FOR DETECTING AND RESTORING OFF-NORMAL SELECTORS

Filed July 11, 1961

| | FIG.4 | FIG.7 |
|---|---|---|
| FIG.8 | FIG.3 | FIG.6 |
| | FIG.2 | FIG.5 |

FIG. 8

INVENTORS
CHARLES E. BROOKS
H. J. O'NEILL
W. M. STOVER

BY

ATTORNEY

United States Patent Office 3,086,084
Patented Apr. 16, 1963

3,086,084
CIRCUIT FOR DETECTING AND RESTORING
OFF-NORMAL SELECTORS
Charles E. Brooks, Maplewood, N.J., Harold J. O'Neill,
Flushing, N.Y., and Warren M. Stover, Ramsey, N.J.,
assignors to Bell Telephone Laboratories, Incorporated,
New York, N.Y., a corporation of New York
Filed July 11, 1961, Ser. No. 123,299
13 Claims. (Cl. 179—18)

This invention relates to a testing circuit and more particularly to a circuit for detecting and restoring off-normal selectors.

Among the several different types of automatic telephone systems now in general use is the panel system, which is so designated because the contact banks used in the system take the form of flat panels. F. A. Stearn Patent 1,505,171, August 19, 1924, discloses basic portions of a typical telephone switching system of the panel type. Reference may also be had to the text, "Telephone Theory and Practice" by Kempster B. Miller, vol. 3, chapter IV (copyright 1933 by the McGraw-Hill Book Co., Inc.) for further description of the panel type switching system.

One of the more important equipment elements of the panel system is the sequence switch, which comprises a plurality of electrical contact cams mounted on a horizontal shaft, suitable driving means being provided for rotating the shaft. Four brushes bear on each of the cams and any two or more of each set of brushes can be connected through the respective cam in any given position of the switch by proper design and cutting of the contacting faces. The rotating shaft can be stopped in any one of eighteen positions, a roller detent arrangement being provided for properly centering the switch in a respective stopped position. The sequence switch is used in the sender circuit and in the various selector circuits (including the incoming selector which is particularly referred to subsequently) where it is arranged to move from position to position as the circuit functioning progresses, accomplishing as it moves many of the essential circuit operations. A typical sequence switch structure is described in J. N. Reynolds et al. Patent 1,127,808, February 9, 1915, and reference may also be made to the above-mentioned chapter of the Kempster B. Miller text for further description of the sequence switch.

While the sequence switch is, as stated above, one of the more important equipment units of the panel system and has, in general, performed its functions adequately, it has nonetheless been subject to the objectionable feature that it very often remains in an off-normal position after a portion of the circuit operation has been completed when it should ordinarily return to normal position. The term "abnormal off-normal condition" as used herein is intended to define a sequence switch remaining in an off-normal position for a time interval exceeding that involved in the normal operations of the switch. The switch may have been moved to off-normal position through some mechanical medium, or, more commonly, by an incompleted circuit operation such as a call which is abandoned before completion. Since successful completion of a subsequent call is dependent upon the premise that the sequence switches be in normal position at the start of the call, it becomes apparent that serious malfunctions of the system result from this improper operation of the sequence switches. This is particularly true with regard to the incoming selector circuit.

Various methods have been followed in the past in an attempt to alleviate the difficulties resulting from this tendency of the sequence switches to remain in off-normal position. For example, in some panel type exchanges the practice has been followed of having a frame attendant, at periods of low traffic such as early morning, manually rotate all off-normal sequence switches to their normal positions. Also electrical circuit means for accomplishing the objective have been proposed as exemplified, for example, by C. H. Berry Patent 1,601,058, September 28, 1926. However, all of these prior methods have failed for one reason or another to provide an entirely satisfactory solution to the problem.

Accordingly, it is an object of our invention to improve the operation of panel type telephone switching systems.

A more specific object of the invention is to eliminate inaccurate operations in panel type telephone switching systems resulting from sequence switches improperly remaining in off-normal positions.

A still more specific object of the invention is to detect off-normal sequence switches in incoming selector circuits and to automatically return such sequence switches to normal position According to a specific embodiment of the invention the circuit, which is arranged to check incoming selectors in panel offices and to detect and restore to normal position any sequence switches remaining in off-normal positions 3, 9 or 11 beyond the normal operating time, comprises two main portions, the detector and release circuit and the stepping or advancing relay circuit for connecting the incoming selectors in turn and preferably in pairs to the detector and release circuit. (Due to inherent circuit conditions it has been found that in the majority of "abnormally off-normal" conditions, the sequence switch is off-normal in positions 3, 9 or 11.) The stepping circuit is set into operation by closing a key and operates in step with an interrupter to advance or "walk along" from one pair of incoming selectors to the next; the advancing is interrupted upon encountering an off-normal sequence switch. The detector and release circuit utilizes two multigrid electronic tubes, one associated with the timer and the other controlling the operation of certain relays when ground is applied to either of the grids by a sequence switch in an off-normal position. If this off-normal condition prevails over a predetermined period, as determined by operation of the first-mentioned tube, ground is applied over a particular lead to operate a certain relay in the incoming selector; operation of the relay advances the sequence switch to normal position. In the event the ground is removed from the grid of the second-mentioned tube before expiration of the predetermined time period, the advancing or stepping circuit again starts to function to move on to the next pair of incoming selectors.

It is a feature of our invention that a plurality of sequence switches are sequentially connected to a checking circuit for detecting off-normal conditions, the sequential connecting being interrupted on such detection and the off-normal condition being timed. Further in accordance with this feature of our invention a sequence switch in an abnormal off-normal condition is restored to normal position and the sequential connecting of subsequent sequence switches is then continued.

It is another feature of the invention that the sequence switches be connected to the detector circuit and thus be checked for abnormal off-normal conditions in pairs.

It is still another feature of our invention that the sequence switches be connected to the checking circuit by three leads, ground being applied when a switch is in an abnormal off-normal position to the first lead, to initiate operation of the checking circuit, and to the second lead, the checking circuit operating to connect the second lead to the third lead thereby returning the ground condition to the selector with which the sequence switch is associated, the third lead at the selector effecting operation of the driving means of the sequence switch to return the switch to normal position.

A further feature of the invention is means for adjusting the duration of the predetermined period during which the detected sequence switch remains in off-normal position before the detector and release circuit operates to restore it to normal position.

A further feature of the invention is means whereby the circuit may be effected to make either one complete examination or scan of the group of incoming selectors under observance and then stop, or to perform a continuous scanning or examination of the group.

A still further feature of the invention is means whereby detection of an off-normal sequence switch results in sounding an alarm at the end of the time period and holding the switch in the off-normal position for further observance.

A full understanding of the arrangement contemplated by the present invention as well as an appreciation of the various features thereof may be gained from consideration of the following detailed description in connection with the accompanying drawing, in which.

Figures 1, 2:
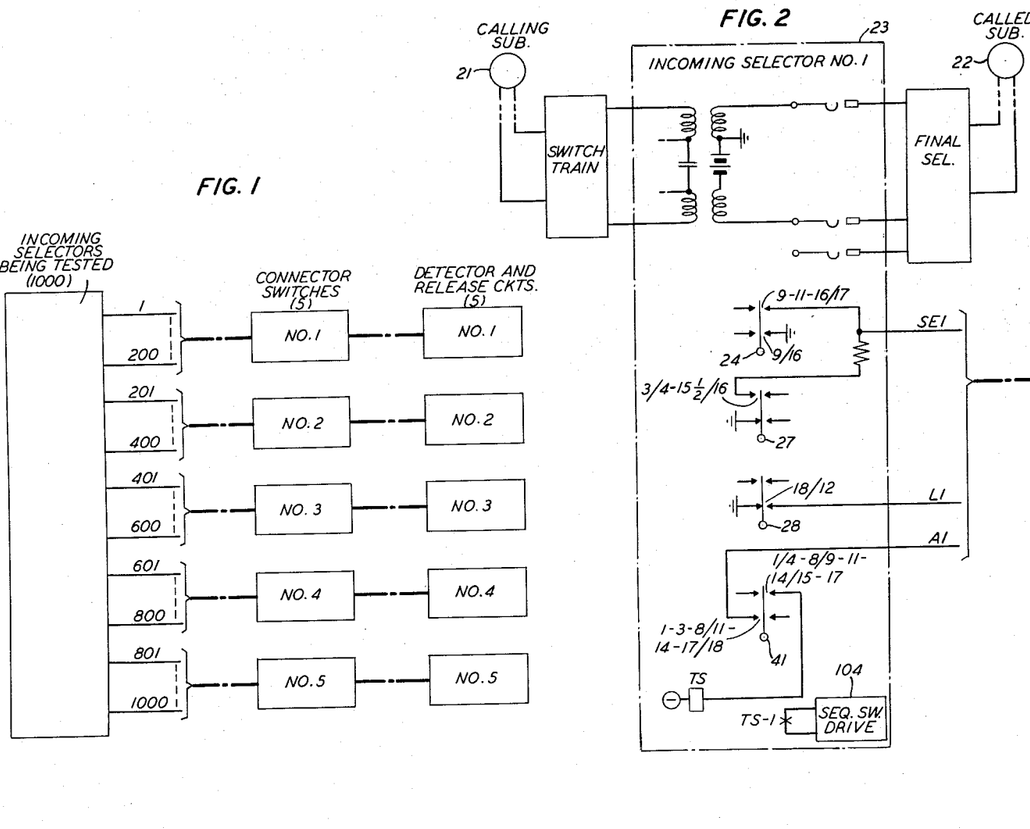
FIG. 1 shows schematically one way in which the detector and release circuits contemplated by the present invention may be utilized to test a plurality of incoming selectors.
FIG. 2 shows schematically a portion of a typical incoming selector circuit, only those elements of the circuit which are actively involved in the functioning of the circuits contemplated by the present invention being shown in detail.

The arrangement and operation of the various elements of the circuits contemplated by the present invention will be described in detail subsequently in connection with FIGS. 2 to 7. However, in order to first gain a general overall understanding of the arrangement a brief description will be given at this point with reference to FIG. 1. As indicated in FIG. 1, one thousand incoming selectors are served by only five detector and release circuits (FIG. 4) of the novel type contemplated by the invention. Five connector switches (FIG. 3) are utilized to connect the incoming selectors in turn, and in pairs, to the proper detector and release circuit. That is, connector switch No. 1 connects in turn the incoming selectors in the 1 to 200 group to the No. 1 detector and release circuit, connector switch No. 2 connects in turn the incoming selectors in the 201 to 400 group to the No. 2 detector and release circuit and so on, connector switch No. 5 connecting in turn the incoming selectors in group 801 to 1000 to the No. 5 detector and release circuit.

With regard now to each group, for example the 1 to 200 group of incoming selectors, each incoming selector is connected in turn over three leads, designated for convenience "SE," "L" and "A" (with proper modifying digits), to the No. 1 detector and release circuit by connector switch No. 1; as previously pointed out above the incoming selectors are connected in respective pairs, two selectors of each group being tested at the same time.

As each respective pair of incoming selectors is connected to the detector and release circuit, should a sequence switch of either selector be in off-normal position 3, 9 or 11 then a ground will be present on the SE lead connected to the detector and release circuit. This will cause energization of a vacuum tube and operation of certain relays in the detector and release circuit effective to start measuring a timing interval, for example, five seconds. The stepping circuit does not advance during this timing period. If the ground is removed from the SE lead before time-out occurs, that is if the sequence switch advances from the off-normal position, for example through circuit operation inherent in the selector, the stepping circuit is released and it functions to connect the next pair of incoming selectors to the detector and release circuit. However, if the ground prevails and the timer circuit functions, the detector and release circuit function to connect leads L and A and to apply the ground, which is connected to lead L, over the A lead to the respective incoming selector; this ground operates the TS relay of the incoming selector which, in turn, causes rotation of the sequence switch to normal position. The detector and release circuit restores to normal and the stepping or advancing circuit functions to step along and connect the next pair of incoming selectors.

If desired, the circuit may be arranged to light a lamp and sound an alarm at the end of the time-out period thus calling to the attention of an attendant the off-normal sequence switch; the stepping circuit does not advance in this instance until the sequence switch has been restored manually or by other means. This procedure may be followed, for example, when it appears that a particular sequence switch is consistently giving trouble.

Thus, according to the novel arrangement contemplated by the present invention, with the five detector and release circuits ten incoming selectors are under examination at the same time. If any one of the ten is off-normal the stepping circuit does not advance; if all ten are normal, or when all become normal, the stepping circuit advances and a new pair of incoming selectors are connected to each of the five detector and release circuits. By a simple key operation the circuit may be set for either one complete examination or scan of the one thousand incoming selectors or for a continuous examination thereof. Under average conditions one thousand selectors can be completely examined or scanned in approximately one minute if no off-normal sequence switches are encountered.

Referring now to the more detailed drawings, and first to FIG. 2, there is shown in that figure in a schematic form a connection between a calling subscriber 21 and a called subscriber 22, which connection includes incoming selector 23 which is assumed for purposes of further description to be the first incoming selector in the group of one thousand to be patrolled. In order to avoid needless complication of the present disclosure by showing what is already well known in the art, only those portions of the incoming selector are shown in detail which are actively involved in the operation of the detector and release circuit contemplated by the invention. An incoming selector of typical design is shown, for example, in FIG. 4 of the above-referred F. A. Stearn Patent 1,505,171. While a substantial number of sequence switch cams are, of course, utilized in the incoming selector, each with its respective plurality of brushes, only the four cams actually involved in the operation of the present circuit are shown in FIG. 2. Also the driving means controlled by operation of relay TS is not shown in detail; it will be assumed that the usual driving means as described in the Stearn patent or the Reynolds et al. patent previously referred to or in the above-mentioned Kempster B. Miller text is provided. The usual method of indicating cam closures is followed with regard to the respective brushes utilized in the circuit operations contemplated by the invention; the closures of the other brushes are not shown nor is the wiring therefor. It will be understood that the cams and brushes utilized are those of the actual incoming selector and that many of the cam closures indicated, while utilized in the normal operation of the incoming selector, are not actually involved in the functioning of the circuits of the present invention. It will be understood, further, that the arrangement of the sequence switch cams may vary in different incoming selectors.

It will be noted that the sensing lead (SE1) is connected over shunt paths to the right upper brush of cam 24 and to the left upper brush of cam 27. Since, as indicated, the upper right brush of cam 24 is closed in positions 9 and 11 (as well as other indicated positions) and as the closures of the lower right brush also include positions 9 and 11 and as that brush is connected to ground, it will be apparent that lead SE1 picks up ground at cam 24 when the sequence switch is in off-normal positions 9 or 11. Since the upper left brush of cam 27 is closed in position 3 (among others) and since the lower left brush is closed to ground in all positions it will be likewise apparent that lead SE1 will pick up ground at cam 27 when the sequence switch is off-normal in position 3. In line with the usual practice, designations of single closure positions are separated by a dash (—), for example "1—3—8" indicating closures in positions 1, 3 and 8, while a group of closures is indicated by an inclined line (/), for example "8/11" indicating closures in positions 8 through 11.

The above-mentioned brush closures as well as those involved with leads L1 and A1 will be discussed further in connection with subsequent detailed description of the circuits. However, it will be readily apparent even at this point that provision of the testing procedures contemplated by the present invention does not necessitate any revision or rearrangement of the cam arrangements as they already exist and are utilized in the normal incoming selector circuit; particular brushes having the specific cam closures required for effecting the functions of the contemplated circuit are selected and utilized as subsequently described.

Figure 3:
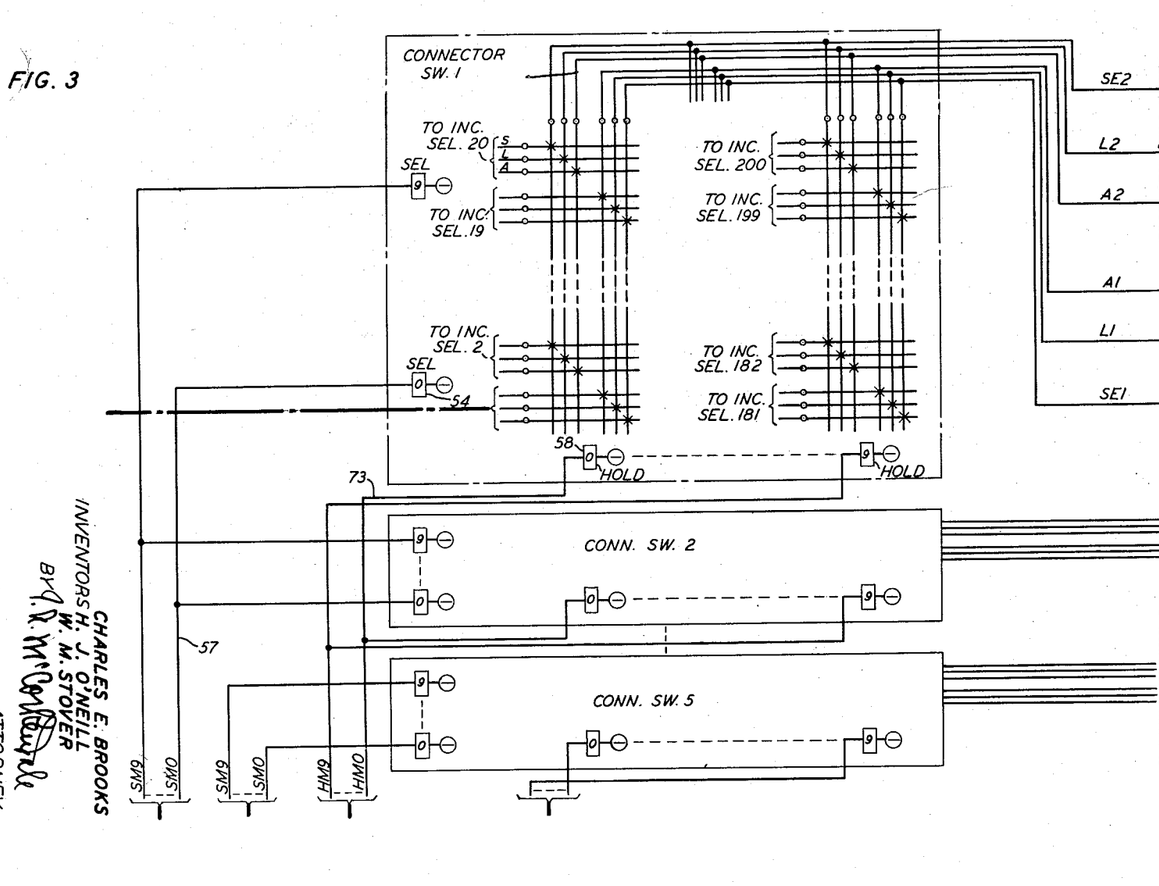
FIG. 3 shows the arrangement of the connector switches utilized in one specific illustrative embodiment of the invention, one connector switch being shown in detail and two others being indicated schematically.
Figure 4:
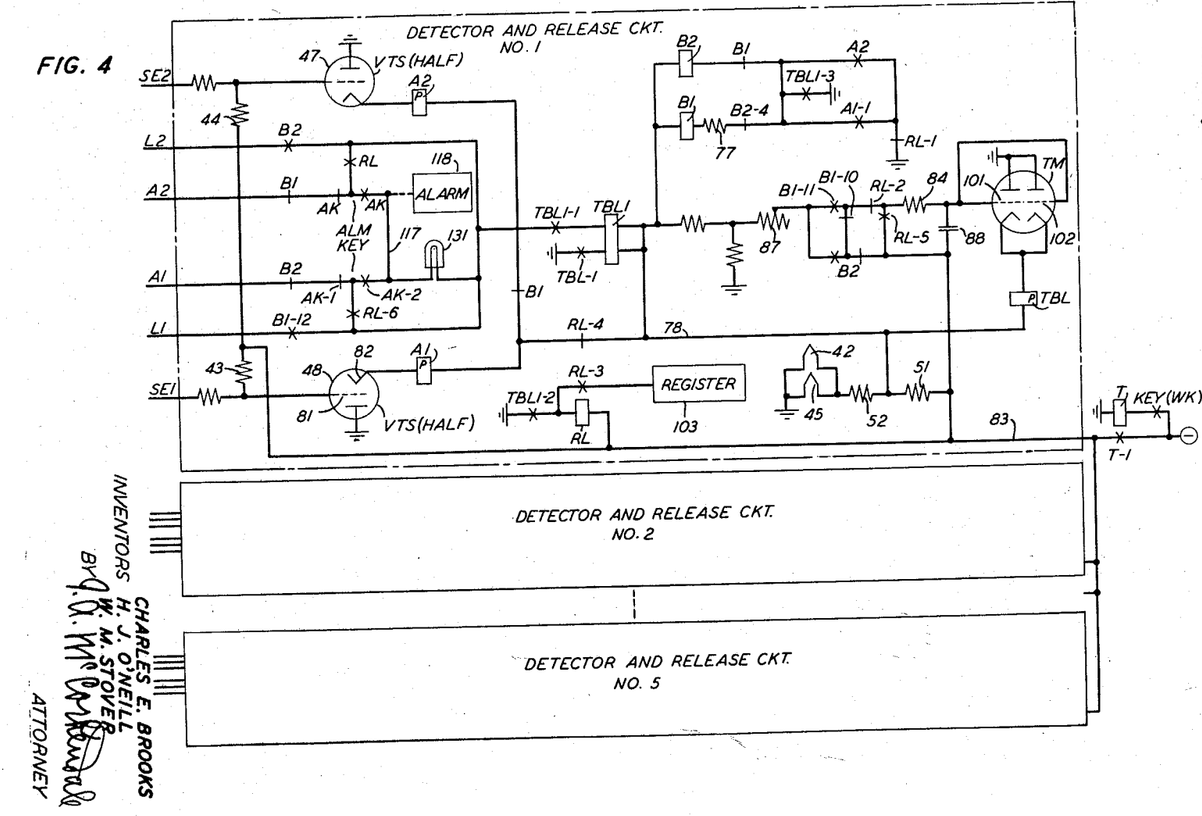
FIG. 4 shows the arrangement of the detector and release circuits utilized in the specific illustrative embodiment of the invention, one detector and release circuit being shown in detail and two others being indicated schematically.
Figure 5:
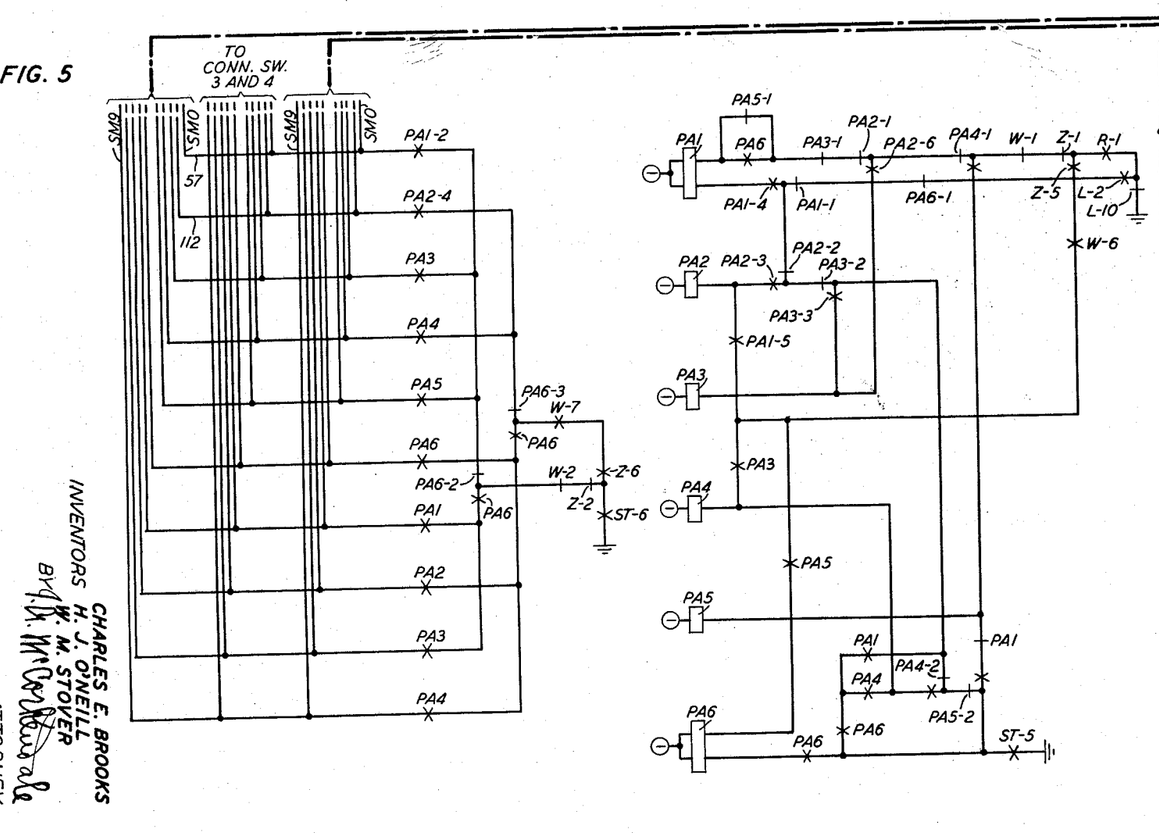
FIG. 5 shows details of the stepping or advancing circuit with particular regard to control of the select magnets of the connector switches.

As indicated schematically in the drawings, and particularly in FIG. 3, two hundred incoming selectors, No. 1 to No. 200 inclusive, are connected, each by three leads, to connector switch No. 1. A similar group is connected to connector switch No. 2 and so on, one thousand incoming selectors being divided equally between the five connector switches. The connection of incoming selector No. 1 over leads SE1, L1 and A1, to connector switch No. 1 is indicated by brackets and dash-dot lines, and it will be understood that the other connections are made in a similar manner. It will be recalled as stated above that the respective connector switches operate to connect the incoming selectors to the associated detector and release circuits in pairs.

The testing circuit is prepared for operation by first closing key WK (FIG. 4) which is a locking key; this completes an obvious operating path for relay T which operates and holds. Relay T, operated, completes through its T-1 make contact a path for connecting battery to heater element 42 of vacuum tube VTS as well as to grid bias resistors 43 and 44. For purposes of convenient illustration and clear description, tube VTS, a multielement vacuum tube, is shown in two halves and the heater element 42 is shown separately. To aid still further in subsequent description the upper half of the tube is designated 47 and the lower half is designated 48. It will be assumed that in the specific illustrative embodiment of the invention the voltage at the common junction point of resistors 51 and 52 will be approximately 4 volts positive with respect to the —48 volt supply. At the end of the normal heating period of the tube operating conditions are established whereby both halves of the tube, 47 and 48, are cut off. (Heater element 45 of vacuum tube TM is also shown apart from the tube; the operation of tube TM will be described subsequently.)

Figures 7, 8:
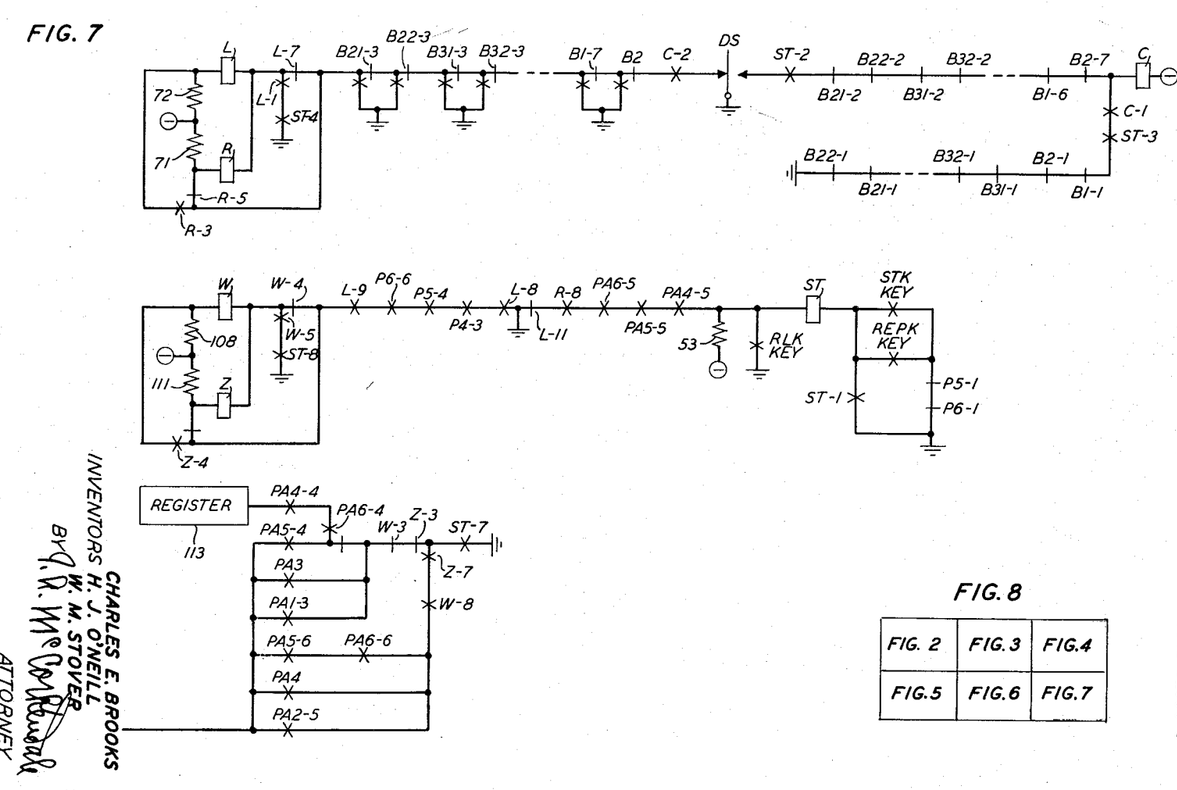
FIG. 7 shows still further details of the stepping circuit with particular reference to the start control portion thereof.
FIG. 8 shows the manner in which certain of the figures should be joined when in use.

After the tube has been allowed sufficient time to heat up the circuit is actually set into operation by closing either key STK or key REPK (FIG. 7). These keys are similar in their function except that key STK is a non-locking key and effects one complete examination or scan of the incoming selectors while key REPK is a locking key and effects continuously repeated examinations or scannings. Closure of either key completes a path for operating relay ST traced from ground, break contacts P6–1 of relay P6 and P5–1 of relay P5, closed contacts of either key REPK or STK, winding of relay ST, resistor 53 to battery.

Relay ST, operated, closes a holding path to ground through its ST–1 make contact and closes through its ST–2 make contact an obvious path for operating relay C, which path is completed when interrupter DS connects ground to its right-hand contact; relay C upon operating locks to ground through its own make contact C–1, make contact ST–3 of relay ST, break contact B1–1 of relay B1 and break contact B2–1 of relay B2. As shown this path also includes break contacts of relays of the other detector and release circuits corresponding to relays B1 and B2 of detector and release circuit No. 1. Contacts of four of these relays B21, B22, B31 and B32 are shown and others are indicated by the broken line. The operation of the stepping circuit in this way reflects the condition of all of the detector and release circuits. Relay C, operated, closes at its C–2 make contact an obvious path for operating relay L, which path is completed when interrupter DS connects ground to its left-hand contact.

Relay L, upon operating, locks to ground through its own make contact L–1 and make contact ST–4 of relay ST; when the interrupter (DS) ground is removed from its left-hand contact, relay R operates from battery through resistor 71, its own operating winding, and make contacts L–1 of relay L and ST–4 of relay ST to ground. While the interrupter is in this position, therefore, both relays L and R are operated. However, when the interrupter again connects ground to its left-hand contact, relay L will then release due to the shunting path through resistor 72 and make contact R–3 of relay R to the interrupter ground. At this point relay R holds to the interrupter ground through break contact L–7 of relay L since its break contact R–5 prevents a shunt path for its operating winding.

While relays L and R are both operated, relay PA1 (FIG. 5) operates over a path from battery, upper winding of relay PA1, break contacts PA5–1 of relay PA5, PA3–1 of relay PA3, PA2–1 of relay PA2, PA4–1 of relay PA4, W–1 of relay W and Z–1 of relay Z, make contacts R–1 of relay R and L–2 of relay L, break contacts PA6–1 of relay PA6, PA1–1 of relay PA1, PA2–2 of relay PA2, PA3–2 of relay PA3, PA4–2 of relay PA4 and PA5–2 of relay PA5 and make contact ST–5 of relay ST to ground.

Relay PA1, operated, completes paths for operation of the zero (0) select magnets of the various connector switches; this path for operating select magnet 54 of connector switch No. 1, for example, is traced from ground, make contact ST–6 of relay ST (FIG. 5), break contacts Z–2 of relay Z, W–2 of relay W, and PA6–2 of relay PA6, make contact PA1–2 of relay PA1, lead 57 (as indicated by the brackets and dash-dot lines), winding of select magnet 54 (FIG. 3) to battery.

Relay PA1, upon operating, also completes a path for operation of relay P1 (FIG. 6) traced from ground, make contact ST–7 of relay ST (FIG. 7), break contacts Z–3 of relay Z and W–3 of relay W, make contacts PA1–3 of relay PA1, R–2 of relay R (FIG. 6), and L–3 of relay L, break contacts P4–1 of relay P4, P2–2 of relay P2, P3–1 of relay P3, and P5–2 of relay P5, upper winding of relay P1 to battery.

Relay PA1 (FIG. 5), when operated as above described, locks to ground over a path through its lower winding and make contact PA1–4, break contacts PA2–2 of relay PA2, PA3–2 of relay PA3, PA4–2 of relay PA4, and PA5–2 of relay PA5, and make contact ST–5 of relay ST. Similarly, relay P1 (FIG. 6), when operated, held from battery, its lower winding and make contact P1–1, break contacts P2–3 of relay P2, P3–2 of relay P3, P4–2 of relay P4, P5–3 of relay P5, make contact PA1–3 (FIG. 7) of relay PA1, break contacts W–3 of relay W and Z–3 of relay Z, make contact ST–7 of relay ST to ground.

Relay P1, operated, completes paths for operation of the zero (0) hold magnets of the various connector switches; the path for operating hold magnet 58 of connector switch No. 1, for example, is traced from ground, break contact L–4 of relay L (relay L now having released following operation of relay R and operation of interrupter DS to connect ground to the left-hand contact thereof as above described), make contact R–4 of relay R, break contact P6–2 of relay P6, make contact P1–2 of relay P1, lead 73 (as indicated by the brackets and dash-dot lines) through the operating winding of hold magnet 58 to battery.

Now with zero (0) hold magnet 58 operated, as just described, and with zero (0) select magnet 54 also operated, as described in a preceding paragraph, crosspoint contacts of connector switch No. 1 are closed effective to connect incoming selector No. 1 (FIG. 2) and incoming selector No. 2 (as indicated by bracket, FIG. 3) to the No. 1 detector and release circuit (FIG. 4) over respective groups of leads A1, L1, SE1 and A2, L2 and SE2.

Incoming Selectors Normal

Assuming first that both incoming selector No. 1 and incoming selector No. 2 are normal, that is that in neither selector is there a sequence switch off-normal, then neither sensing lead SE1 nor SE2 will find ground, and the condition of detector and release circuit No. 1 will not be changed. Accordingly the "stepping or advancing" circuit will function as now described to connect the next pair of incoming selectors to detector and release circuit No. 1. (Actually, of course, as pointed out above five pairs of incoming selectors are being tested simultaneously by five detector and release circuits, and it is being assumed for our present purposes of description that the particular condition, normal or off-normal, prevailing in the pair under specific discussion, prevails as well in the remaining pairs.)

Figure 6:
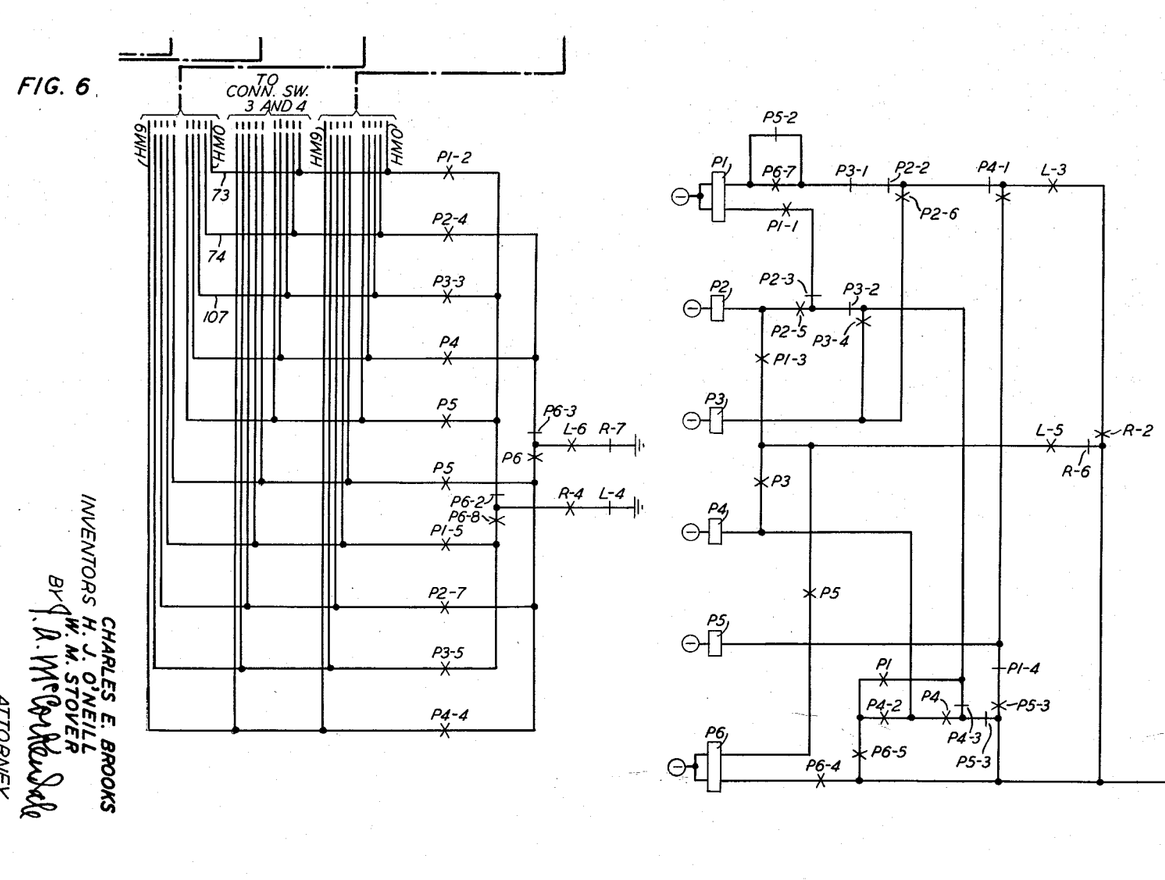
FIG. 6 shows further details of the stepping circuit with particular regard to control of the hold magnets of the connector switches.

It will be recalled that in the last positions described relay R was operated and relay L was released. Now when the interrupter DS (FIG. 7) operates to remove ground from the left-hand contact relay R will release which releases hold magnet 58 by opening the previously traced operating path therefor at make contact R–4 (FIG. 6). When ground is again connected to the left-hand contact of interrupter DS relay L will operate to this ground over the path previously traced, and upon operating, will lock to ground through its own make contact L–1 and make contact ST–4 of relay ST. Incoming selectors No. 1 and No. 2 are disconnected from the test circuit following release of relay R and hold magnet 58 as described.

With relay L operated and relay R released, relay P2 (FIG. 6) will operate over a path from ground, make contact ST–7 of relay ST (FIG. 7), break contacts Z–3 of relay Z and W–3 of relay W, make contact PA1–3 of relay PA1, break contact R–6 of relay R, make contacts L–5 of relay L and P1–3 of relay P1, winding of relay P2 to battery. Relay P2, operated, completes an operating path for the next hold magnet "one" (1), not shown but indicated (FIG. 3), the path being traced from ground, break contact R–7 of relay R (FIG. 6), make contact L–6 of relay L, break contact P6–3 of relay P6, make contact P2–4 of relay P2, conductor 74 to battery on the hold magnet. Since the zero selector magnet 54 remains operated, operation of the No. 1 hold magnet results in connecting of incoming selectors No. 3 and No. 4 to the detector and release circuit.

Operation of relay P2 is followed by release of relay P1 since the holding path therefor is interrupted at break contact P2–3 of relay P2. Relay P2, however, holds through its own make contact P2–5, break contacts P3–2 of relay P3, P4–3 of relay P4, P5–3 of relay P5, make contact PA1–3 (FIG. 7) of relay PA1, break contacts W–3 of relay W and Z–3 of relay Z, make contact ST–7 of relay ST to ground.

Off-Normal Incoming Selector Detected

The operations of the stepping circuit will be further described subsequently but before doing so let us return to consideration of the first connection described above, that is the connection of incoming selectors No. 1 and No. 2 to the detector and release circuit No. 1, and let us assume for purposes of further description that incoming selector No. 1 is off-normal, that is that the associated sequence switch is in off-normal position 3. In this case ground will be connected to lead SE1 from cam 27 of the incoming selector (FIG. 2) since the upper left brush is closed in position 3 (as well as in other positions with which we are not concerned at present) and since the lower left brush is closed in all positions and is connected to ground. The ground applied over lead SE1 to grid 81 of half 48 of vacuum tube VTS will cause the grid 81 to become several volts positive with respect to the cathode 82 and current will flow to operate the associated relay A1, a polarized relay. Relay A1, operated, completes an operating path for relay B1 (FIG. 4) traced from ground, break contact RL–1 of relay RL, make contact A1–1 of relay A1, break contact B2–4 of relay B2, resistor 77, winding of relay B1, conductor 78, resistor 51, conductor 83, make contact T–1 of relay T to battery. (Resistor 77 included in the operating path of relay B1 prevents simultaneous operation of relays B2 and B1 in the event ground should be found on both leads SE1 and SE2.)

Relay B1, operated, opens at its B1–1 break contact the holding path for relay C (FIG. 7) which releases thereby opening at its C–2 make contact the path for connecting ground from interrupter DS to relays L and R whereby to prevent further operation of the stepping circuit. The operating path for relay C is interrupted at break contact B1–6 of relay B1 while the path from interrupter DS to relays L and R is further interrupted at break contact B1–7 of relay B1. These paths, similar to the path through make contact C–1 of relay C described above, include break contacts of relays of other detector and release circuits corresponding to relays B1 and B2; contacts of four of these relays, B21, B22, B31 and B32, are shown.

Operation of Timing Circuit

Relay B1 (FIG. 4), operated as above described, disconnects at its B1–10 break contact direct battery (conductor 83) from resistor 84 and connects the resistor through break contact RL–2 of relay RL and make contact B1–11 of relay B1 to the intermediate potential established at the movable contact of variable resistor 87. (In the specific illustrative embodiment the potential at this point may be set initially in the vicinity of 5 volts positive to the —48 volt potential.) Capacitor 88 now starts to charge through fixed resistor 84 and variable resistor 87.

As the potential applied to grids 101 and 102 of vacuum tube TM rises, the tube starts to pass current; when a value of about +4.5 volts is reached, relay TBL operates. (By adjustment of variable resistor 87 the time required for operation of relay TBL can be varied over a given range, for example from three to seven seconds. This is the time, of course, a ground on the sensing lead must prevail in order for the circuit to recognize an "abnormal off-normal" condition in a sequence switch. If the sequence switch is only momentarily off-normal in a normal circuit operation and the ground "disappears" before expiration of the time period, the stepping circuit will be restored to normal operation.) Relay TBL, operated, completes a path for operating relay TBL1 traced from ground, make contact TBL–1 of relay TBL, lower winding of relay TBL1, lead 78, resistor 51, lead 83, make contact T–1 of relay T to battery.

Relay TBL1, upon operating, locks to ground in the off-normal incoming selector over a path traced from battery, make contact T–1 of relay T, lead 83, resistor 51, lead 78, upper winding and make contact TBL1–1 of relay TBL1, make contact B1–12 of relay B1, lead L1, incoming selector No. 1 (FIG. 2), lower right brush of cam 28 (closed in positions 18 through 12), lower left brush of cam 28 (closed in all positions) to ground.

*Release of Off-Normal Incoming Selector*

Relay TBL1, operated as above described, completes a path for operating relay RL (FIG. 4) traced from ground, make contact TBL1–2 of relay TBL1, winding of relay RL, lead 83, make contact T–1 of relay T to battery. Relay RL, operated, closes at its make contact RL–3 a path for operation of register 103 which counts the number of off-normal incoming selectors released in a given period.

Operation of relay RL also interrupts at its RL–1 break contact the previously traced operating path for relay B1, which is held, however, by ground through make contact TBL1–3 of relay TBL1. Also, relay RL upon operating interrupts at its RL–4 break contact the operating path of relay A1, which releases, closes at its make contact RL–5 a discharge path for capacitor 88 and closes at its make contact RL–6 a connecting path between leads L1 and A1.

As capacitor 88 discharges, the current passed by vacuum tube TM will decrease until relay TBL releases; relay TBL1 remains locked at this point however over the previously described holding path.

In view of the path closed between lines L1 and A1 by make contact RL–6 of relay RL (FIG. 4), the ground connected to line L1 at cam 28 of the incoming selector (FIG. 2) is now connected through to line A1 (through make contact RL–6) and back over that line to the lower left brush of sequence switch cam 41 (FIG. 2). Since the lower left brush and the upper right brush of cam 41 are both closed in position 3 with which we are presently concerned (as well as other indicated off-normal positions with which we are not concerned at the present time) the ground on lead A1 will be connected through to relay TS (FIG. 2) which now operates. Relay TS, operated, closes at its TS–1 make contact a control path for sequence switch drive 104 which operates to return the sequence switch to normal position. As pointed out above, sequence switch drive 104 may be the usual magnet and disk arrangement as described in F. A. Stearn Patent 1,505,171; J. N. Reynolds et al. Patent 1,127,808, or the Miller text, "Telephone Theory and Practice," vol. 3, chapter IV.

Following release of the TBL relay as mentioned above, the TBL1 relay remained operated from the ground on lead L1 at the off-normal sequence switch cam 28, make contact B1–12 of relay B1 (FIG. 4), make contact TBL1–1 and upper winding of relay TBL1, lead 78, resistor 51, lead 83, make contact T–1 of relay T to battery. However, as the sequence switch is being restored to normal and after it passes position 12, ground is removed from lead L1 since, as indicated, the right lower brush of cam 28 is closed only through positions 18 to 12; relay TBL1 releases therefore. Release of relay TBL1 is followed by release of relay B1 since the holding path therefor is interrupted at make contact TBL1–3 of relay TBL1; the detector and release circuit is now restored to normal condition.

It will be understood that in the above-described situation had the off-normal sequence switch been detected in incoming selector No. 2 instead of No. 1, then half 47 of vacuum tube VTS would have been affected, (since ground would have been found on sensing lead SE2) and relays A2 and B2 would have been operated instead of relays A1 and B1. The overall operation of the circuits would be generally similar to that described in connection with incoming selector No. 1. It will be understood, further, that had the sequence switch been off-normal in positions 9 or 11, instead of position 3, the operation would have been generally similar to that described. As pointed out above in connection with the operation of relay B1 (FIG. 4), a resistor is included in the operating path thereof whereby to prevent simultaneous operation of relays B1 and B2, with attempts at timer seizure, in the event ground is found on both sensing leads associated with a respective pair of incoming selectors under test.

*Further Operation of Stepping Circuit*

When the B1 relay releases, relay C (FIG. 7) again operates to reactivate the stepping or advancing circuit, the operating path extending from ground on the right-hand contact of interrupter DS, make contact ST–2 of relay ST, break contact B1–6 of relay B1 and break contact B2–7 of relay B2, winding of relay C to battery. (This path also includes break contacts of relays of the other detector and release circuits.) As previously described above operation of relay C is followed by operation, first, of relay L and, second, by operation of relay R, relay L releasing then each time ground is connected to the left-hand contact of interrupter DS. In the preceding description prior to the section, "Off-Normal Incoming Selector Detected," the operation of the stepping circuit was described inclusive of operation of relay P2 (FIG. 6) and connection of incoming selectors No. 3 and No. 4 to the detector and release circuit.

Now at the time both relays L and R are operated, a path is established for operating relay P3 (FIG. 6) traced from ground, make contact ST–7 of relay ST (FIG. 7), break contacts Z–3 of relay Z and W–3 of relay W, make contact PA1–3 of relay PA1, make contacts R–2 (FIG. 6) of relay R and L–3 of relay L, break contact P4–1 of relay P4, make contact P2–6 of relay P2, winding of relay P3 to battery; relay P3 operates. When relay L next releases in step with the operation of interrupter DS, a path is completed for operation of hold magnet No. 3 (not shown but indicated in FIG. 3) of connector switch No. 1, this path being traced from ground, break contact L–4 of relay L, make contact R–4 of relay R, break contact P6–2 of relay P6, make contact P3–3 of relay P3, over lead 107 to battery on the winding of hold magnet No. 3. Since select magnet 54 holds operated the next pair of incoming selectors are now connected to detector and release circuit No. 1.

Relay P3 (FIG. 6), upon operating as above described, locks through its make contact P3–4, break contacts P4–3 of relay P4 and P5–3 of relay P5, make contact PA1–3 (FIG. 7) of relay PA1, break contacts W–3 of relay W and Z–3 of relay Z, make contact ST–7 of relay ST to ground.

This stepping action continues until finally relay P6 operates and locks through its P6–4 make contact. At this point we start a second operation of relay P1 to P5 in order to effect operation of the remaining hold magnets H5 to H9, inclusive. Relay P1, for example, now operates for the second time, when both relays L and R are operated, from ground, make contact ST–7 of relay ST, break contacts Z–3 of relay Z and W–3 of relay W, make contacts PA1–3 of relay PA1, R–2 of relay R, and L–3 of relay L, break contacts P4–1 of relay P4, P2–2 of relay P2, P3–1 of relay P3, make contact P6–7 of relay P6, upper winding of relay P1 to battery. P1 relay, upon operating, locks as previously described and relay P5 releases at this time since its holding path is interrupted at break contact P1–4 of relay P1.

This second series of operations of the P relays continues through relay P5 with the operating paths for respective hold magnets being completed through P6–8 make contact of relay P6, held operated as above described, and respective make contacts P1–5, of relay P1, P2–7 of relay P2, P3–5 of relay P3 and P4–4 of relay P4. It will be noted that relay P4 is held operated through its own make contact P4–2 and make contact P6–5 of relay P6 (held operated as described above) and that relay P5 is held operated through break contact P1–4 of relay P1 and its own make contact P5–3. We have, therefore, at this point (when relay L is operated) an operating path for relay W (FIG. 7) traced from ground, make contacts L–8 of relay L, P4–3 of relay P4, P5–4 of relay P5, P6–6 of relay P6, L–9 of relay L, break contact W–4, winding of relay W, resistor 108 to battery. Relay W operates and locks through its make contact W–5 and make contact ST–8 of relay ST to ground Operation of relay W is followed by release of the 0 (zero) select magnets, since the path from ground is interrupted at break contact W–2 (FIG. 5), and by the release of relays P4, P5 and P6 (FIG. 6), since the path to holding ground is interrupted at break contact W–3 (FIG. 7).

When relay L releases, relay Z (FIG. 7) operates from battery, resistor 111, winding of relay Z, make contact W–5 of relay W and make contact ST–8 of relay ST to ground. With this condition, relay R still being operated, a path is completed for operation of relay PA2 (FIG. 5) traced from ground, break contact L–10 of relay L, make contacts R–1 of relay R, Z–5 of relay Z, W–6 of relay W, PA1–5 of relay PA1, winding of relay PA2 to battery. Relay PA2, upon operating, locks through its make contact PA2–3, break contacts PA3–2 of relay PA3, PA4–2 of relay PA4 and PA5–2 of relay PA5, make contact ST–5 of relay ST to ground; relay PA1 releases as its holding path is interrupted at break contact PA2–2 of relay PA2.

A path is now completed for operation of No. 1 select magnet (not shown, but indicated in FIG. 3), this path being traced (FIG. 5) from ground, make contacts ST–6 of relay ST, Z–6 of relay Z, W–7 of relay W, break contact PA6–3 of relay PA6, make contact PA2–4 of relay PA2, conductor 112 to battery on the select magnet.

Relay P1 (FIG. 6) now operates for the start of another chain operation of the P relays for operation in turn of the next series of hold magnets, the present operating path for relay P1 being traced from ground, make contacts ST–7 of relay ST (FIG. 7), Z–7 of relay Z, W–8 of relay W, PA2–5 of relay PA2, R–2 of relay R and L–3 of relay L, break contacts P4–1 of relay P4, P2–2 of relay P2, P3–1 of relay P3, P5–2 of relay P5, upper winding of relay P1 to battery. Relay P1, upon operating, locks through its lower winding and make contact P1–1, break contacts P2–3 of relay P2, P3–2 of relay P3, P4–3 of relay P4, P5–3 of relay P5, make contacts PA2–5 of relay PA2, W–8 of relay W, Z–7 of relay Z, ST–7 of relay ST to ground.

This series of operations of the P relays continues as previously described until the condition is again reached where relays P4, P5 and P6 are all in operated position. Now, with relay L operated, relay W (FIG. 7) will release due to the shunt path through resistor 108, and make contacts Z–4 of relay Z, L–9 of relay L, P6–6 of relay P6, P5–4 of relay P5, P4–3 of relay P4, L–8 of relay L to ground. Release of relay W will be followed by release of the select magnets, since the path for supply of ground is interrupted at make contact W–7 (FIG. 5), as well as by the release of relays P4, P5 and P6 since the holding path therefor is interrupted at make contact W–8 of relay W.

The Z relay releases following release of relay W since the holding path is interrupted at make contact W–5 of relay W. Now with relay L released and relay R still operated, relay PA3 (FIG. 5) operates from ground, break contact L–10 of relay L, make contact R–1 of relay R, break contacts Z–1 of relay Z, W–1 of relay W, PA4–1 of relay PA4, make contact PA2–6 of relay PA2, winding of relay PA3 to battery. Relay PA3, upon operating, locks to ground through its make contact PA3–3, break contacts PA4–2 of relay PA4, PA5–2 of relay PA5, and make contact ST–5 of relay ST.

The above-described action continues except for interruptions occurring when off-normal incoming selectors are detected as previously described. The P relays control the successive operations of the hold magnets and upon each occurrence of the situation where the P4, P5 and P6 relays are all in operated condition at the same time, the W and Z relays operate whereby to operate an additional relay in the PA group. Relays in the PA group control operation of the select magnets.

At the end of the cycle, with relays PA4, PA5 and PA6 operated, register 113 (FIG. 7) will operate. This register counts the number of cycles completed by the stepping circuit over a given period and the operating path is traced from ground, make contacts ST–7 of relay ST, Z–7 of relay Z, W–8 of relay W, PA6–6 of relay PA6, PA5–6 and PA5–4 of relay PA5, PA6–4 of relay PA6 and PA4–4 of relay PA4 to battery at the register.

Relay ST will release at this point since the battery path through resistor 53 (FIG. 7) over which relay ST held operated is now shunted to ground through make contacts PA4–5 of relay PA4, PA5–5 of relay PA5, PA6–5 of relay PA6 and R–8 of relay R and break contact L–11 of relay L. Release of relay ST restores the circuit to normal condition since the holding paths for any operated PA relays and any operated P relays are interrupted. The C, W and Z relays also release. If the REPK key, a locking key, is in operated position the cycle will be immediately repeated. Otherwise, the STK key can be operated when desired for an additional cycle.

*Off-Normal Incoming Selector Hold and Alarm*

In the above-described instance where incoming selector 23 was found to be off-normal in that the sequence switch was standing in position 3, it might, under some circumstances, be desirable to hold the stepping or advancing circuit at that point and to alert the attendant to the condition rather than to automatically return the sequence switch to normal position as described above. For example, if it should be suspected that a particular sequence switch is causing repeated cases of trouble, it might be considered desirable to have all detected off-normal switches in the same general area inspected by an attendant when detected so that any inherent operating difficulties could be detected and corrected.

Accordingly, let us assume that in the above-described situation, ground has been detected on sensing lead SE1 indicating an off-normal sequence switch, in this particular instance off-normal in position 3. It will be assumed, further, that the alarm key (ALM, FIG. 4), a locking key has been operated. It will be recalled that in the earlier described operation, after the time-out period had expired, relays TBL, TBL1 and RL operated and that the ground on lead L1 was connected through make contact RL–6 of relay RL to lead A1 and passed thereover to the incoming selector where it caused operation of relay TS to restore the sequence switch to normal position. In the present instance, however, that is with ALM key operated, lead A1 is open at break contact AK–1 of the key so that the restoring circuit for the sequence switch is not completed; the ground now is connected through make contact AK–2 of the key to conductor 117 and thereover to alarm 118 which may, if desired, be located at a point remote from the detector and release circuit, for example near the group of incoming selectors being tested. Also, alarm lamp 131 is lighted at this time as an indication of the "held" selector, from the ground on lead L1, make contact RL–6 of relay RL, make contact AK–2 of the ALM key, lamp 131, make contact TBL1–1 and upper winding of relay TBL1, lead 78, resistor 51, lead 83, make contact T–1 of relay T to battery.

At such time as the off-normal sequence switch is restored to normal (for example it may be manually restored by an attendant responding to alarm 118) ground will be removed from leads SE1 and L1 and the detector and release circuit will be restored to normal and the stepping circuit will resume its stepping action. It will be apparent, of course, that the detector and release circuit can be set at any time to automatically restore the sequence switch simply by moving the ALM key to normal, open position.

Release of Circuit

As pointed out above, the circuit restores to normal at the end of a complete cycle of all the incoming selectors under test unless the REPK key is in operated position in which event a second cycle is started. However, at any point in the functioning of the circuit it can be restored to normal simply by operating the release (RLK) key (FIG. 7). Operation of the RLK key causes release of the ST relay because of the shunt path to ground through resistor 53 and the make contact of the key. Release of relay ST releases relay C and removes the holding grounds for relays L, R, W, Z, and any operated relays in the P and PA groups, thereby restoring the circuit to normal. When the RLK key is restored to normal the stepping circuit will start its examination or scan at the first crosspoint of its cycle rather than resuming at the point where the stepping was interrupted by operation of the RLK key.

While a specific embodiment of the invention has been selected for detailed disclosure, the invention is not, of course, limited in its application to the embodiment disclosed. The embodiment which has been described should be taken as illustrative rather than restrictive thereof.

What is claimed is:

1. In an automatic telephone system including calling lines, called lines and a plurality of selectors for completing connections between said calling and said called lines, a sequence switch associated with each of said selectors, said sequence switches being rotatable from a normal position through a plurality of off-normal positions, means for checking said selectors for detecting any associated sequence switches in an abnormal off-normal condition, stepping means for connecting said selectors in turn to said checking means, means effective upon detecting a sequence switch in an abnormal off-normal condition for stopping operation of said stepping means, means for restoring the sequence switch to normal position, and means for restarting said stepping means.

2. In an automatic telephone system including calling lines, called lines and a plurality of selectors for completing connections between said calling and said called lines, a sequence switch associated with each of said selectors, each of said sequence switches including a plurality of commonly supported cams, a plurality of contact brushes associated with each of said cams and driving means for rotating said cams from a normal position through a plurality of off-normal positions, means for checking said selectors whereby to detect any associated sequence switch in an off-normal position, timer means included in said checking means for measuring a predetermined time interval, stepping means for connecting said selectors in turn to said checking means, means effective upon detecting a sequence switch in an off-normal position for a period exceeding said predetermined time interval for stopping operation of said stepping means, actuating the driving means of the off-normal sequence switch whereby to restore it to normal position and restarting said stepping means, and manually controlled means for preventing the actuation of said driving means and for actuating an alarm.

3. In an automatic telephone system, the combination defined by claim 2 further characterized in the provision of means for varying the duration of said predetermined time interval.

4. In an automatic telephone system, the combination defined by claim 2 further characterized in that said timer means includes a capacitor, a charging circuit for said capacitor and means for varying said charging rate whereby to vary the duration of said predetermined interval.

5. In an automatic telephone system including calling lines, called lines and a plurality of selectors for completing connections between said calling lines and said called lines, a sequence switch associated with each of said selectors, each sequence switch including a plurality of commonly supported cams, a plurality of contact brushes associated with each of said cams and driving means for rotating said cams from a normal position through a plurality of off-normal positions, means for checking said selectors whereby to detect any associated sequence switch in an off-normal position, means for connecting said selectors in turn to said checking means, said connecting means including a first lead, a second lead and a third lead, means effective upon connection of a selector having an off-normal sequence switch to said checking means for connecting ground from cams of the off-normal sequence switch to said first and said second leads, means included in said checking means for connecting said second and said third leads whereby to connect ground to said third lead, and means at said selector for connecting said grounded third lead to the driving means of the sequence switch whereby to actuate said driving means to return said sequence switch to normal position.

6. In an automatic telephone system, the combination defined by claim 5 further characterized in that said connecting means included in said checking means comprises a relay and means for operating said relay only if the ground connected to said first lead prevails for a period exceeding a predetermined time interval.

7. In an automatic telephone system, the combination defined by claim 6 further characterized in the provision of means for varying the duration of said predetermined time interval.

8. In an automatic telephone system including calling lines, called lines and a plurality of selectors for completing connections between said calling lines and said called lines, a sequence switch associated with each of said selectors, each sequence switch including a plurality of commonly supported cams, a plurality of contact brushes associated with each of said cams and driving means for rotating said cams from a normal position through a plurality of off-normal positions, means for checking said selectors whereby to detect any associated sequence switch in an off-normal position, means for connecting said selectors in turn to said checking means, said connecting means including a first lead, a second lead and a third lead, means effective upon connection of a selector having an off-normal sequence switch to said checking means for connecting ground from cams of the off-normal sequence switch to said first and said second leads, means included in said checking means for connecting said second and said third leads whereby to connect ground to said third lead, means at said selector for connecting said third lead to the driving means of the sequence switch, and manually controlled means at said checking means for preventing transmission of ground over said third lead to the selector and for connecting the ground to an alarm for actuation thereof.

9. In an automatic telephone system including calling lines, called lines and a plurality of selector circuits for completing connections between said calling and said called lines, a sequence switch included in each of said selector circuits having a plurality of cams, a plurality of contact brushes associated with each of said cams and means for rotating said cams from a normal position through a plurality of off-normal positions, means for checking said selector circuits for detection of sequence switches remaining in an off-normal position longer than a predetermined time interval, said checking means including an electron tube having a pair of control electrodes, stepping means for connecting said selector circuits in turn and in respective pairs to said checking means, means effective while a respective selector circuit is connected to said checking means for connecting the associated sequence switch to one of said control electrodes, means effective while a sequence switch is in off-normal position for applying ground to the particular one of said control electrodes to which it is then connected, timer means, means effective upon application of the ground to said control electrode for stopping said stepping means and for starting said timer means, and means effective if the ground connection still prevails at the end of said predetermined time interval as measured by said timer means for restoring the sequence switch to normal position.

10. In an automatic telephone system, the combination defined by claim 9 further characterized in the provision of means for varying the extent of said predetermined time interval.

11. In an automatic telephone system, a plurality of selectors, a sequence switch included in each of said selectors, a lesser number of checking circuits for detecting sequence switches in abnormal off-normal condition, a connecting circuit associated with each of said checking circuits and with respective groups of said selectors, means for operating said connecting circuits to connect selectors from the respective groups in turn and in respective pairs to the respectively associated checking circuits, means effective upon detection of a sequence switch in an abnormal off-normal condition in a connected selector for interrupting the operation of all of said connecting circuits, means for restoring the off-normal sequence switch to normal position, and means effective upon said sequence switch being restored to normal position for restarting all of said connecting circuits.

12. In an automatic telephone system, a plurality of selectors, a sequence switch included in each of said selectors, a lesser number of checking circuits for detecting sequence switches in off-normal condition, a connecting circuit associated with each of said checking circuits and with respective groups of said selectors, means for operating said connecting circuits to connect selectors from the respective groups in turn and in respective pairs to the respectively associated checking circuits, means included in each of said checking circuits effective upon detection in a connected selector of a sequence switch remaining in an off-normal position for a period exceeding a predetermined time interval for interrupting the operation of all of said connecting circuits, means for restoring the off-normal sequence switch to normal position, means effective upon said sequence switch being restored to normal position for restarting all of said connecting circuits, and means for preventing simultaneous response of said checking circuit to both selectors of said respective pairs.

13. In an automatic telephone system, the combination defined by claim 12 further characterized in the provision of means for varying the duration of said predetermined time interval.

References Cited in the file of this patent
UNITED STATES PATENTS

| | | |
|---|---|---|
| 2,293,588 | Cain | Aug. 18, 1942 |
| 2,602,121 | Lomax | July 1, 1952 |